US009007169B2

(12) United States Patent
Lee et al.

(10) Patent No.: US 9,007,169 B2
(45) Date of Patent: Apr. 14, 2015

(54) CHARGING ASSEMBLY FOR ELECTRONIC DEVICE

(75) Inventors: Chien-Hung Lee, New Taipei (TW); Shih-Chi Wong, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 837 days.

(21) Appl. No.: 13/197,790

(22) Filed: Aug. 4, 2011

(65) Prior Publication Data
US 2012/0299547 A1 Nov. 29, 2012

(30) Foreign Application Priority Data

May 26, 2011 (TW) .................................. 100118504

(51) Int. Cl.
*G05B 19/00* (2006.01)
*H02J 7/00* (2006.01)
*H02J 7/02* (2006.01)
*G06F 1/16* (2006.01)
*G06F 1/26* (2006.01)

(52) U.S. Cl.
CPC ............. *G06F 1/1632* (2013.01); *H02J 7/0044* (2013.01); *G06F 1/263* (2013.01)

(58) Field of Classification Search
CPC ...... G06F 1/1632; G06F 1/263; H02J 7/0044; B25J 5/00; B25J 19/005
USPC .................. 340/5.73, 636; 320/15, 111, 115; 361/681, 683; 379/446
See application file for complete search history.

(56) References Cited

U.S. PATENT DOCUMENTS

| 6,438,229 | B1* | 8/2002 | Overy et al. .................. 379/446 |
| 8,223,483 | B2* | 7/2012 | Hayashida et al. ...... 361/679.41 |
| 8,482,252 | B2* | 7/2013 | Byrne ........................... 320/115 |
| 2006/0117483 | A1* | 6/2006 | Devitt .............................. 5/621 |
| 2009/0158423 | A1* | 6/2009 | Orlassino et al. ............... 726/19 |

FOREIGN PATENT DOCUMENTS

| CN | 2800542 | 7/2006 |
| CN | 102037201 | 4/2011 |

* cited by examiner

*Primary Examiner* — Daniell L Negron
*Assistant Examiner* — Mancil Littlejohn, Jr.
(74) *Attorney, Agent, or Firm* — Novak Druce Connolly Bove + Quigg LLP

(57) ABSTRACT

A charging apparatus is used to support and charge an electronic device defining a latching slot and includes a holding portion, a placement portion and controlling portion. The placement portion engages with the holding portion and defines a latching notch aiming at the latching slot when the electronic device is received in the placement portion. The controlling portion is secured in the holding portion and includes a magnetic switch and a safety latch. The magnetic switch includes a movable shaft, and the safety latch includes a latching portion engaging with the movable shaft and pivoting to the placement portion, and a buckling portion engaging with the latching notch and the latching slot. The magnetic switch drives the movable shaft move to urge the latching portion rotating relative to the placement portion and to urge the buckling portion passing through the latching notch and engaging with the latching slot.

20 Claims, 9 Drawing Sheets

CHARGING ASSEMBLY FOR ELECTRONIC DEVICE

BACKGROUND

1. Technical Field

The present disclosure relates to a charging assembly, and more particularly to a safety charging assembly.

2. Description of Related Art

In general, electronic devices, especially portable electronic devices, such as tablet personal computers, cellular telephones and other electronic devices, for example, are charged via electrically connecting charging apparatuses with power input terminals of the electronic devices. However, in this method, the electronic device can easily be pulled out from the charging apparatus by any person without the need to enter a password or other identification (ID) authentication. Therefore, the electronic device can easily be stolen because any person can easily remove the electronic device from the charging apparatus without any ill-effects.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
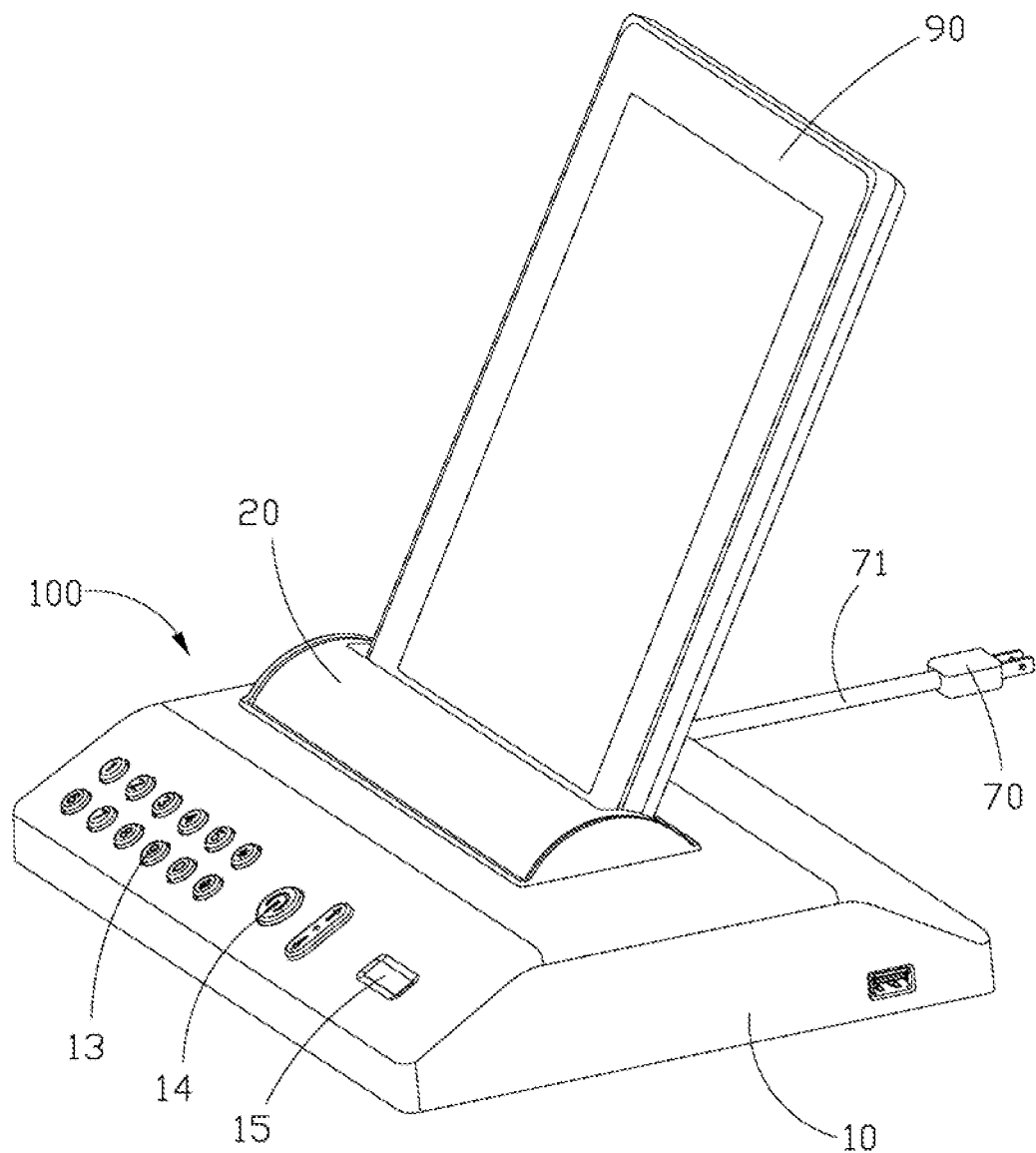
FIG. 1 is a perspective view of one exemplary embodiment of a charging apparatus when charging in accordance with the present disclosure.
Figure 2:
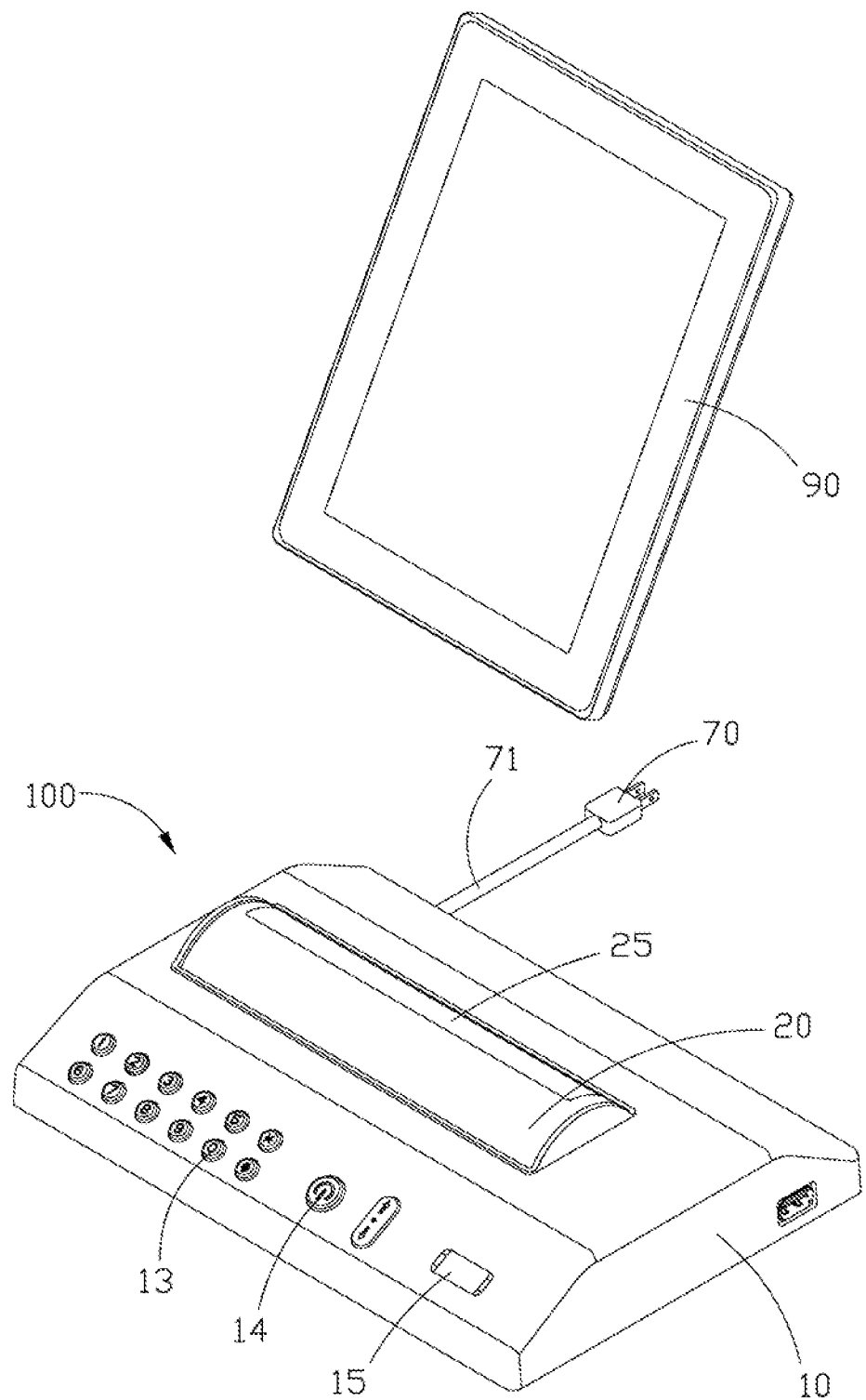
FIG. 2 is a disassembled perspective view of the exemplary embodiment of the charging apparatus and an electronic device of FIG. 1.

Referring to FIG. 1 and FIG. 2, a charging apparatus 100 is used to support and charge an electronic device 90, such as, tablet personal computer, cellular telephone and other portable electronic device, for example.

Figure 3:
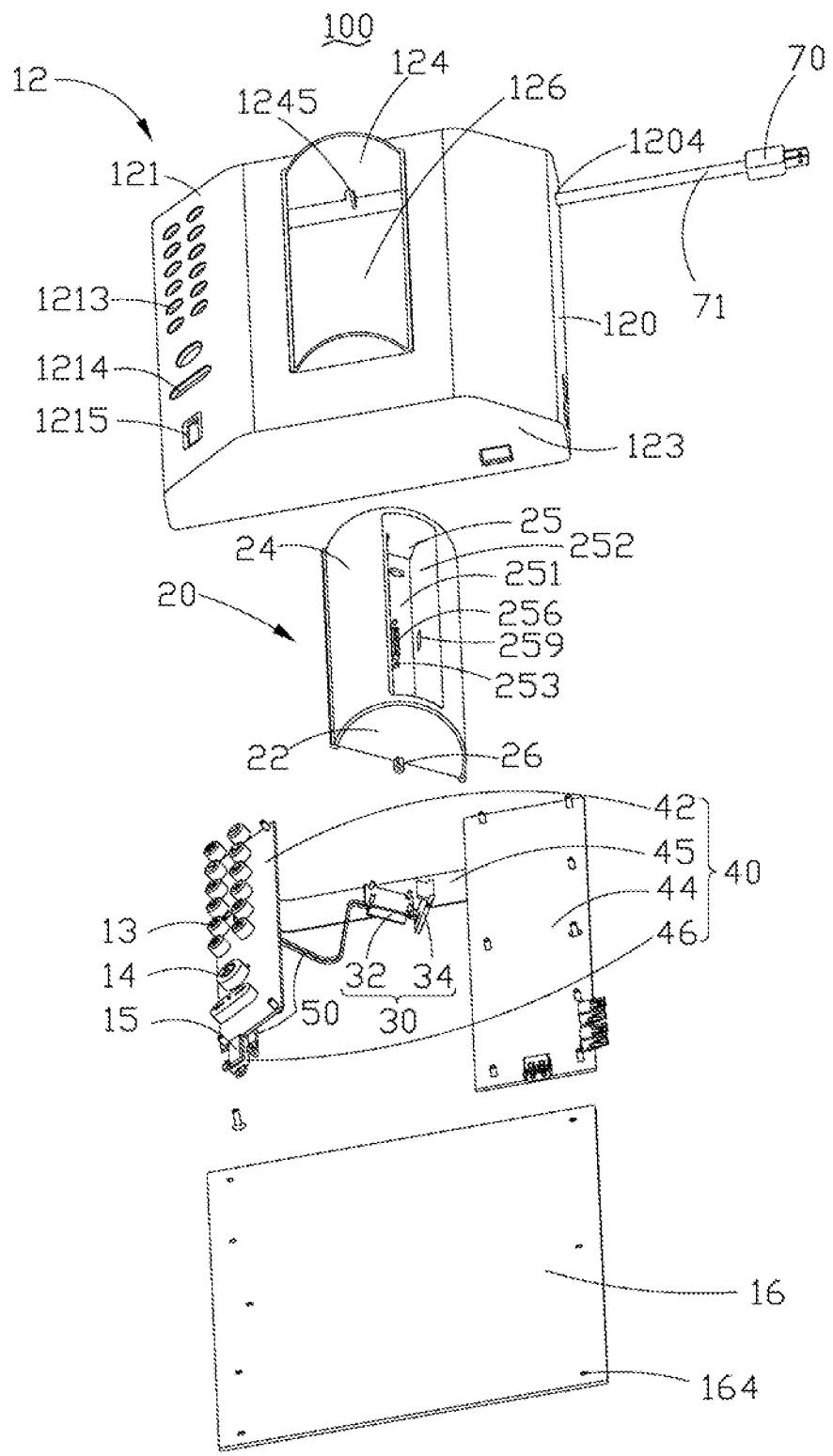
FIG. 3 is an exploded, isometric view of the exemplary embodiment of the charging apparatus of FIG. 2.

Also referring to FIG. 3, the charging apparatus 100 comprises a holding portion 10, a placement portion 20, a controlling portion 30, a circuit board portion 40 and a power input terminal 70. The placement portion 20 pivots on the holding portion 10 to receive and support the electronic device 90. The controlling portion 30 is secured on the placement portion 20 to engage with the electronic device 90. The circuit board portion 40 is securely fixed in the holding portion 10 and electrically connected with the controlling portion 30 and the power input terminal 70.

Figure 4:
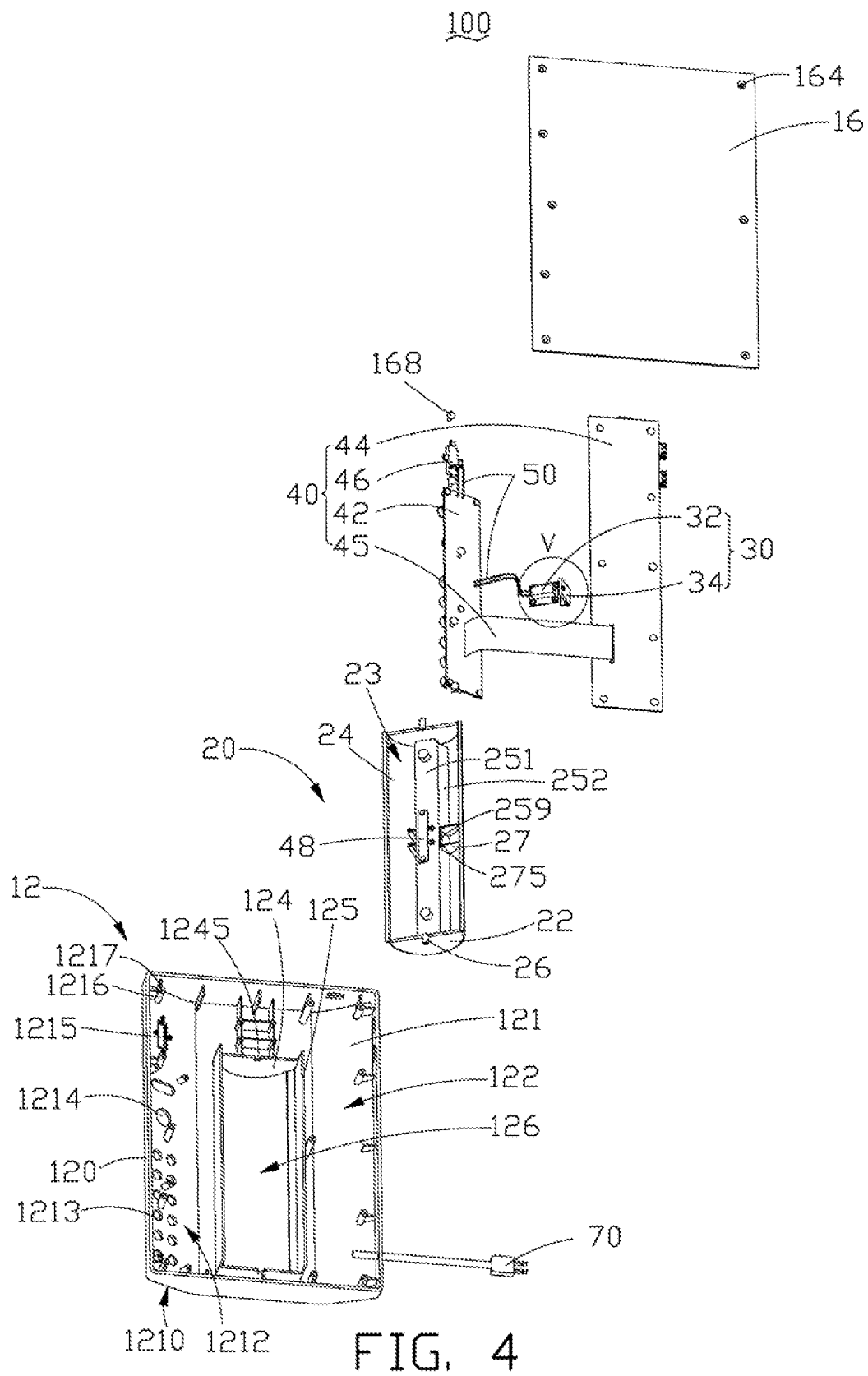
FIG. 4 is an exploded, isometric view of the exemplary embodiment of the charging apparatus of FIG. 3, showing the charging apparatus from another direction.

Also referring to FIG. 4, the holding portion 10 comprises a holding cover 12, a plurality of numeric buttons 13, a power button 14, a fingerprint reader 15 and a bottom cover 16. The holding cover 12 accommodates the placement portion 20 and the controlling portion 30, and the bottom cover 16 is securely fixed on the holding cover 12 to be opposite to the placement portion 20. The plurality of numeric buttons 13, the power button 14 and the fingerprint reader 15 all pass through the holding cover 12 and electrically connect with the circuit board portion 40.

The holding cover 12 comprises a panel 121 and a plurality of first side walls 120 extending from edges of the panel 121 in a same direction. The panel 121 and the plurality of first side walls 120 collectively define a receiving space 122 to receive the controlling portion 30 and the circuit board portion 40. In the illustrated embodiment, across section of the panel 121 is substantially U-shaped, and the receiving space 122 is substantially bowl-shaped.

One of the plurality of first side walls 120 defines a through hole 1204 and an electrical wire 71 passes through the through hole 1204 to electrically connect the power input terminal 70 to the circuit board portion 40.

The panel 121 comprises a first surface 1210 and a second surface 1212 opposite to the first surface 1210. The first surface 1210 is formed on an outer surface of the holding cover 12 and the second surface 1212 is formed on an inner surface of the holding cover 12. The panel 121 defines a plurality of first receiving holes 1213, a second receiving hole 1214 and a third receiving hole 1215 through the first surface 1210 and the second surface 1212. Each of the plurality of numeric buttons 13 is inserted into the corresponding first receiving hole 1213 to electrically connect with the circuit board portion 40, and partially protrudes outwardly from the first surface 1210 for convenient setting or entering passwords. The power button 14 is inserted into the second receiving hole 1214 to electrically connect with the circuit board portion 40, and partially protrudes outwardly from the first surface 1210 for convenient operation. The fingerprint reader 15 is inserted into the third receiving hole 1215 to electrically connect with the circuit board portion 40, and depresses under the first surface 1210 for convenient putting a finger on.

The holding cover 12 further comprises a pair of second side walls 124 and a pair of third side walls 125 perpendicularly connecting with the pair of second side walls 124. The pair of second side walls 124 and the pair of third side walls 125 are respectively in parallel with the plurality of first side walls 120 and collectively define a receiving groove 126 extending from the second surface 1212 to the first surface 1210 to receive the placement portion 20. Each of the pair of second side walls 124 not only perpendicularly extends from the second surface 1212 towards the receiving space 122, but also perpendicularly extends from the first surface 1210 away from the panel 121 and is substantially formed as a semicircle. Each of the pair of third side walls 125 perpendicularly extends from the second surface 1212 towards the receiving space 122. In the illustrated embodiment, each of the pair of third side walls 125 is slightly higher than the corresponding second side walls 124 away from the second surface 1212 to conveniently mount the placement portion 20.

The panel 121 comprises a plurality of protruding columns 1216 protruding from the second surface 1212 towards the receiving space 122. Each of the plurality of protruding columns 1216 defines a first fixing hole 1217 to securely fix the circuit board portion 40 and the bottom cover 16 on the holding cover 12. In the illustrated embodiment, the plurality of protruding columns 1216 is configured between the first side walls 120 and the third side walls 125 to mount the circuit board portion 40 between the first side walls 120 and the third side walls 125.

In the illustrated embodiment, the plurality first side walls 120, the pair of second side walls 124, the pair of third side walls 125 and the plurality of protruding columns 1216 are integrally formed with the panel 121.

The bottom cover 16 covers the receiving space 122 and defines a plurality of second fixing holes 164. The bottom cover 16 is securely fixed on the holding cover 12 by a plurality of first screws 168 passing through the corresponding second fixing holes 164 and screwed in the corresponding first fixing holes 1217.

The placement portion 20 is received in the receiving groove 126 of the holding portion 20, and comprises a main body 24 and a pair of side portions 22 on two sides of the main body 24. In the illustrated embodiment, the main body 24 is substantially formed as a half hollow cylinder, and each of the pair of side portions 22 is substantially formed as a semicircle. The main body 24 and the pair of side portions 22 collectively form a receiving cavity 23 opening to the same direction with the receiving space 122. Each of the pair of second side walls 124 defines a latching groove 1245 to engage with the placement portion 20. In the illustrated embodiment, each of the latching grooves 1245 is substantially formed as a semicircle. The placement portion 20 further comprises a pair of first rotating shafts 26 protruding outwardly from the corresponding side portions 22 to engage with the latching grooves 1245. The pair of first rotating shafts 26 engages with the corresponding latching grooves 1245 to rotatably mount the placement portion 20 on the holding cover 12 with the main body 24 arching relative to the first surface 1210.

Figure 7:
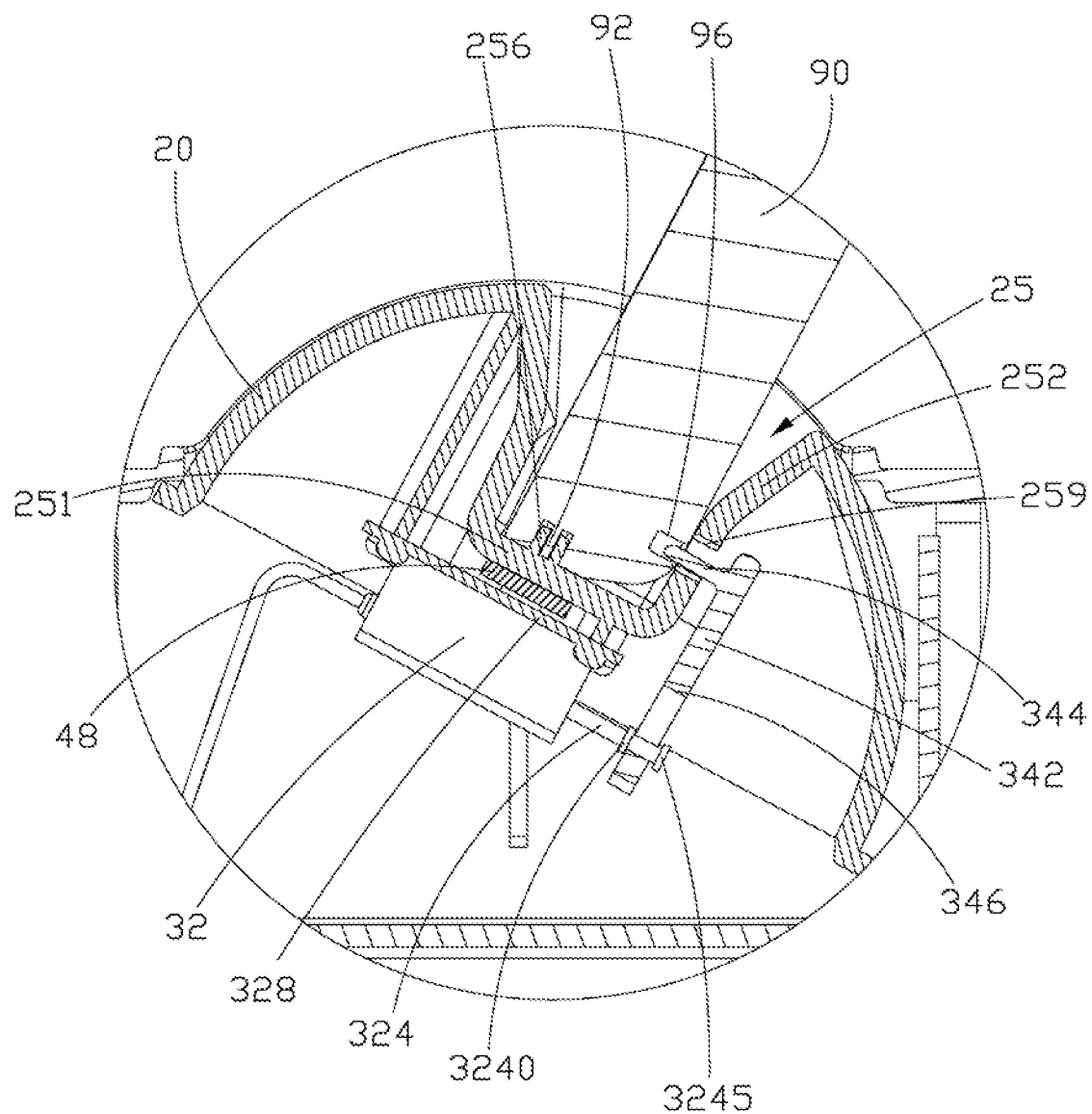
FIG. 7 is an enlarged perspective view of the exemplary embodiment of VII in FIG. 6.

The main body 24 defines a holding groove 25 in the middle thereof. A bottom side 251 formed in the holding groove 25 separates the holding groove 25 from the receiving cavity 23, and a plurality of sidewalls 252 perpendicularly extends from edges of the bottom side 251 to the main body 24. The holding groove 25 is used to receive the electronic device 90, that is, the electronic device 90 is inserted in the holding groove 25 and electrically connected with the holding portion 10 to be charged. The placement portion 20 comprises a pair of positioning columns 253 protruding from the bottom side 251 towards the holding groove 25 and an electrical connector 256 configured between the pair of positioning columns 253. The pair of positioning columns 253 engages with fixing holes of the electronic device 90 (not shown) so as to stably deposit and securely mount the electronic device 90 in the holding groove 25 of the placement portion 20. The electronic device 90 defines a latching slot 96 and one of the sidewalls 252 defines a latching notch 259 that matches with the latching slot 96 when the electronic device 90 is received in the placement portion 20, as shown in FIG. 7. The placement portion 20 further comprises a pair of strengthening boards 27 on two sides of the latching notch 259. The pair of strengthening boards 27 is configured between the corresponding sidewall 252 and the main body 24 to enhance mechanical strength around the latching notch 259. Each of the pair of strengthening boards 27 defines a rotating hole 275 to engage with the controlling portion 30.

Figure 5:
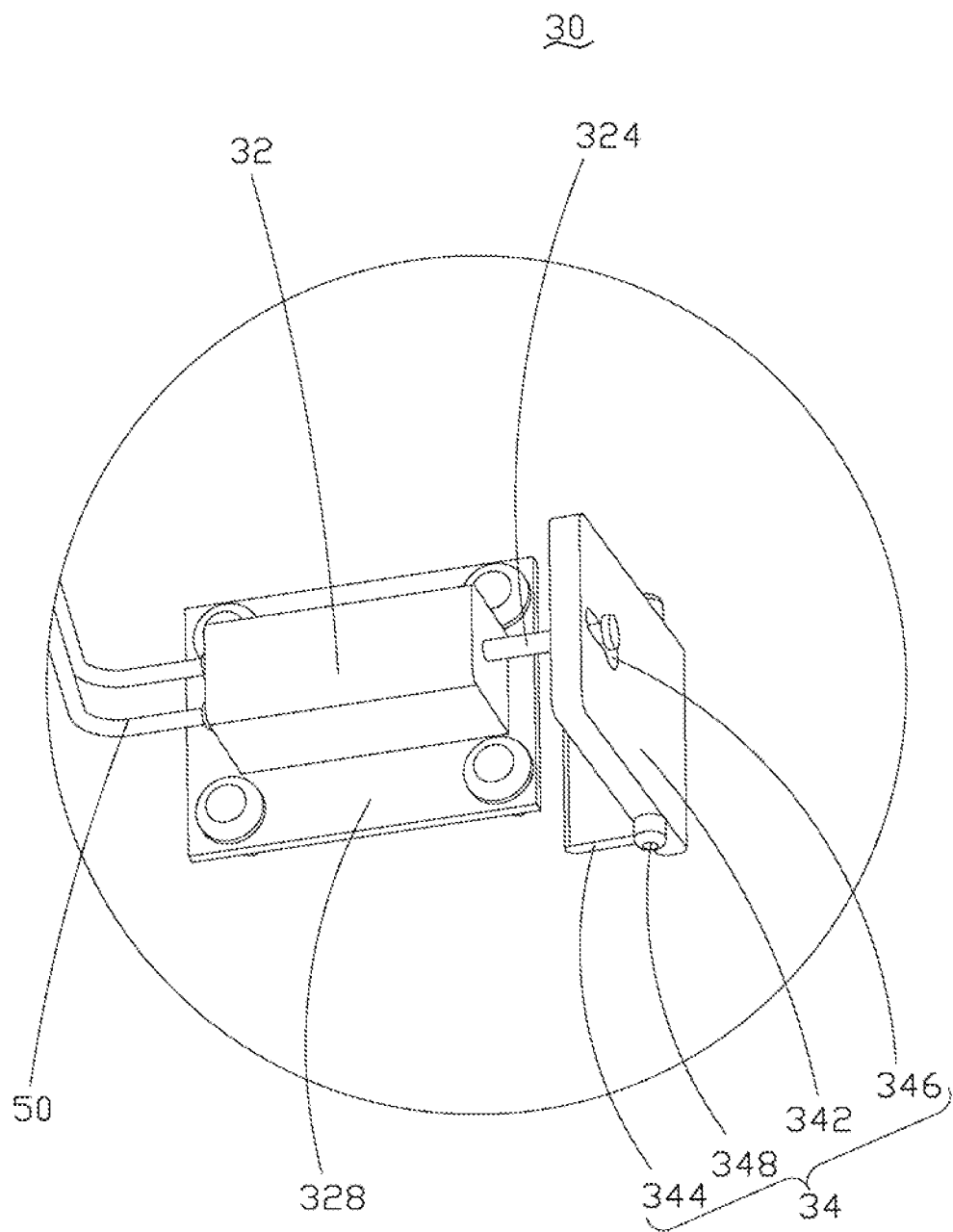
FIG. 5 is an enlarged perspective view of the exemplary embodiment of V in FIG. 4.

Referring to FIG. 5, the controlling portion 30 is fixed on the bottom side 251 to control the electronic device 90 and to lock the electronic device 90 in the charging apparatus 100. The controlling portion 30 comprises a magnetic switch 32 and a safety latch 34. The magnetic switch 32 is securely fixed on the bottom side 251 away from the holding groove 25 via a fixing board 328, and comprises a movable shaft 324 protruding outwardly from one side of the magnetic switch 32 to engage with the safety latch 34. The other side of the magnetic switch 32 electrically connects with the circuit board portion 40 via first electrical wires 50. During the time that the magnetic switch 32 is working, the movable shaft 324 moves to and from relative to the fixing board 328 to drive the safety latch 34 to work. The movable shaft 324 comprises a first block 3240 and a second block 3245 spaced from the first block 3420 to mount the safety latch 34 on the movable shaft 324 between the first block 3240 and the second block 3245, as shown in FIG. 7.

Figure 6:
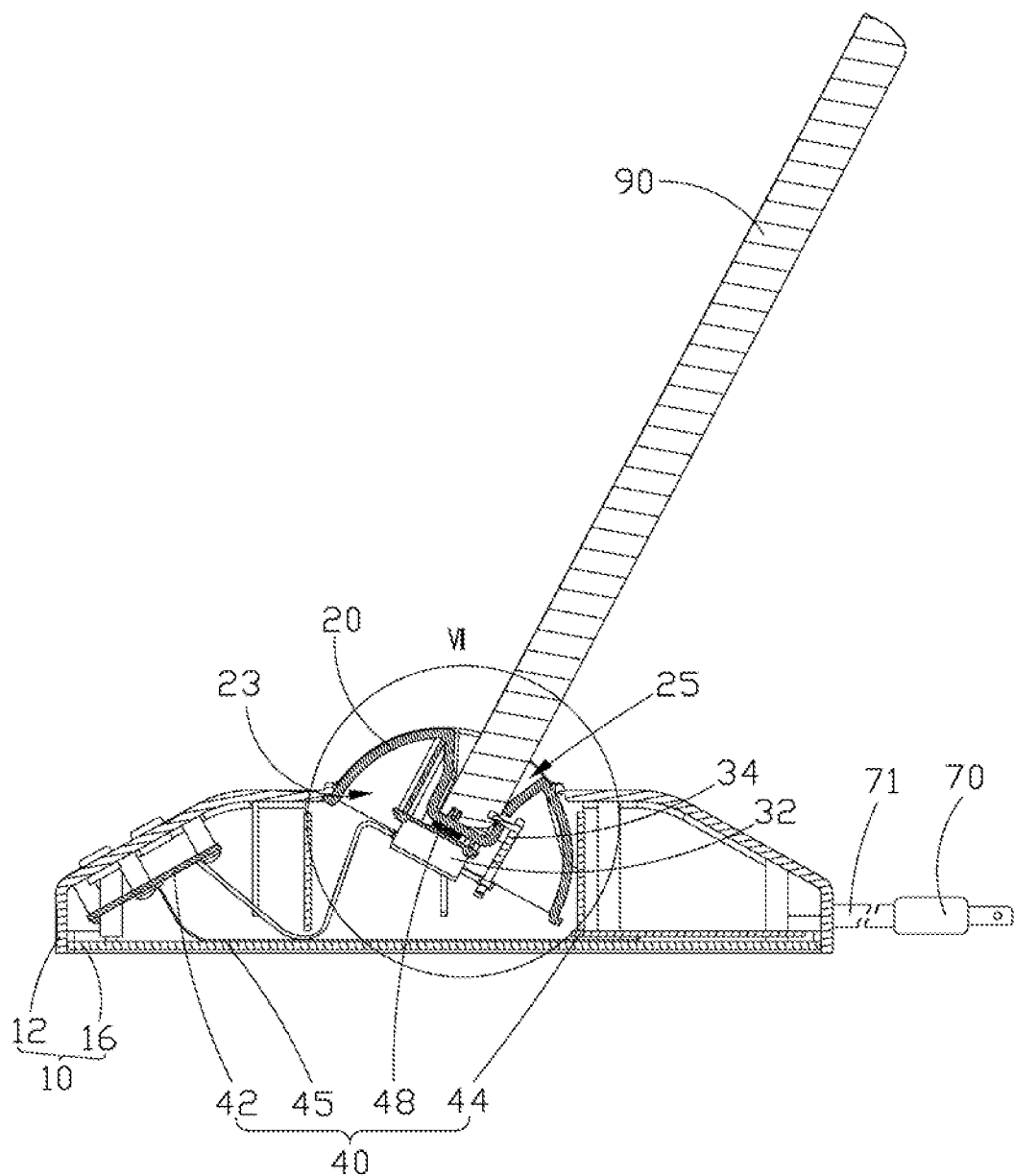
FIG. 6 is a cross-sectional view of the exemplary embodiment of the charging apparatus of FIG. 1, showing the electronic device locked in the charging apparatus.

Also referring to FIG. 6 and FIG. 7, the safety latch 34 engages with the magnetic switch 32 to lock the electronic device 90, and comprises a latching portion 342 pivoting to the placement portion 20 and a buckling portion 344 protruding outwardly from the latching portion 342. The latching portion 342 defines a gourd hole 346 away from the buckling portion 344 to receive the movable shaft 324. The movable shaft 324 passes through the gourd hole 346 to restrict the latching portion 342 between the first block 3240 and the second block 3245 so as to axially mount the latching portion 342 on the movable shaft 324. When starting the magnetic switch 32, the movable shaft 324 moves to impulse the latching portion 342 rotating relative to the placement portion 20, and the buckling portion 344 passes through the latching notch 259 and interferes with a latching slot 96 of the electronic device 90 to be held in the holding portion 10. The latching portion 342 comprises a pair of protruding shafts 348 protruding outwardly from two sides of the latching portion 342. The pair of protruding shafts 348 is configured on two sides of the buckling portion 344 to be rotatably received in the pair of rotating holes 275, so that the safety latch 34 is movably mounted on the placement portion 20. In the illustrated embodiment, the latching portion 342 is integrally formed with the buckling portion 344.

Referring to FIG. 3 and FIG. 4, the circuit board portion 40 is securely mounted in the receiving space 122 of the holding cover 12, and comprises a first printed circuit board 42, a second printed circuit board 44, a fingerprint identifying board 46 and a third printed circuit board 48. The first printed circuit board 42 is securely fixed between the first side wall 120 and the third side wall 125 by screwing screws in the plurality of first fixing holes 1217, and the plurality of numerical buttons 13 and the power button 14 electrically connect with the first printed circuit board 42, respectively. The fingerprint identifying board 46 electrically connects the fingerprint reader 15 with the first printed circuit board 42 via the first electrical wires 50 and is mechanically fixed on the holding cover 12 aside the first printed circuit board 42. Opposite to the first printed circuit board 42, the second printed circuit board 44 is securely fixed between the first side wall 120 and the third side wall 125 by screwing screws in the plurality of first fixing holes 1217, and the power input terminal 70 electrically connects with the second printed circuit board 44 via second electrical wire 71 to supply electrical power to the charging apparatus 100. The third printed circuit board 48 is securely mounted between the fixing board 328 and the bottom side 251 to electrically connect with the electrical connector 256. The magnetic switch 32 electrically connects with the first printed circuit board 42 via the first electrical wires 50 to provide electrical power to the magnetic switch 32, as shown in FIG. 6.

When the power input terminal 70 electrically connecting to the power supply, the charging apparatus 100 starts to work by pressing the power button 14, and the electronic device 90 is in charge by connecting the electrical connector 256 with an import interface 92 of the electronic device 90, as shown in FIG. 7.

The installation of the charging apparatus 100 will be described as below.

Firstly, the placement portion 20 is received in the receiving groove 126 to be mounted in the holding portion 10 and the pair of first rotating shafts 26 engages with the corresponding latching grooves 1245, and the third printed circuit board 48 is securely fixed on the bottom side 251 away from the holding groove 25 to electrically connect with the electrical connector 256. The magnetic switch 32 is securely fixed on the third printed circuit board 48 via the fixing board 328 to make the movable shaft 324 face to the sidewall 252 with the latching notch 259, and the safety latch 34 pivots to the placement portion 20 by receiving the pair of protruding shafts 348 in the corresponding rotating hole 275 and the movable shaft 324 extends through the gourd hole 346 to engage the latching portion 342 between the first block 3240 and the second block 3245. Then, the first printed circuit board 42 is securely fixed in the receiving space 122 and electrically connects with the plurality of numeric buttons 13, the power button 14, the fingerprint reader 15, the magnetic switch 32 and the fingerprint identifying board 46 fixed besides the first printed circuit board 42, and the second printed circuit board 44 is securely fixed in the receiving space 122 and electrically connects with the first printed circuit board 42 via flat cable 46, and with the power input terminal 70. Finally, the bottom cover 16 covers on the open of the receiving space 122 and is secured on the holding cover 12 by a plurality of first screws 168 passing through the corresponding second fixing holes 164 and screwed in the corresponding first fixing holes 1217.

Figure 8:
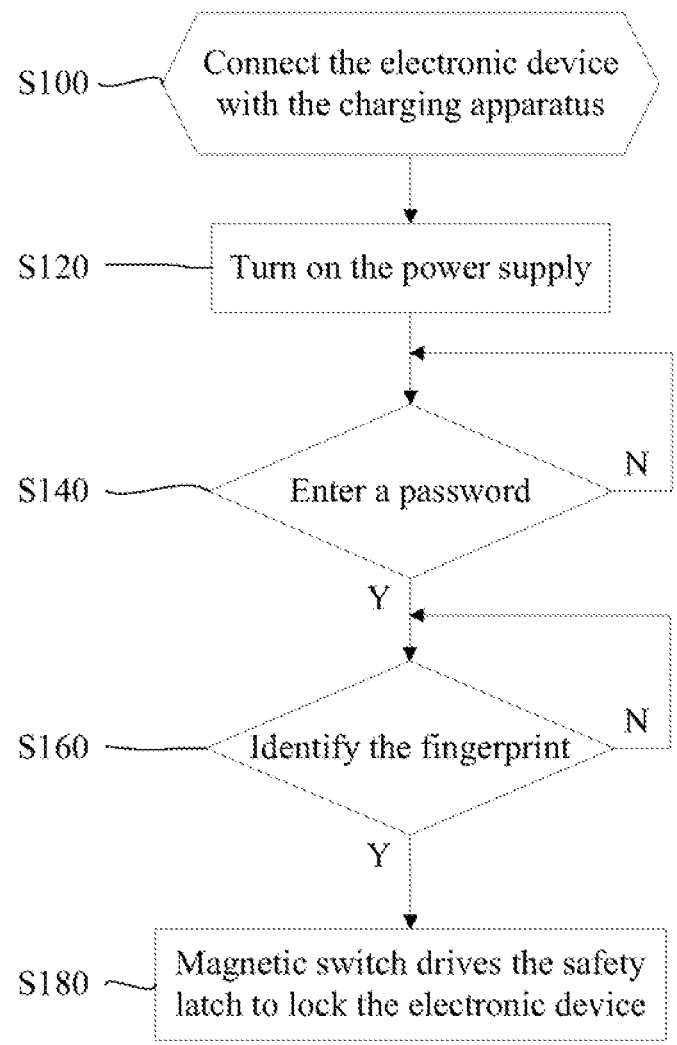
FIG. 8 is a flowchart of the exemplary embodiment of the charging apparatus locking the electronic device in accordance with the present disclosure.

Referring to FIG. 8, in the step S100, the electronic device 90 electrically connects with the charging apparatus 100. In details, the electronic device 90 is securely received in the holding groove 25 by engaging the pair of positioning columns 253 with the electronic device 90 and electrically connects with the charging apparatus 100 by electrically connecting the electrical connector 256 with the import interface 92, as shown in FIG. 6 and FIG. 7. In the step S120, the power input terminal 70 connects to the power supply to start the charging apparatus 100 by turning on the power button 14. In the step S140, the plurality of numeric buttons 13 can be pressed to enter a password which is shown on display screen of the electronic device 90. If the password is correct, the process proceeds to the next step, and if the password is wrong, the process returns to the step S140. In the step S160, the fingerprint reader 15 is pressed by a finger to identify the fingerprint. If the fingerprint matches with the preset fingerprint stored in system, the process proceeds to the next step, and if the password is wrong, the process returns to the step S160. In the step S180, the magnetic switch 32 starts to drive the movable shaft 324 move back and drives the safety latch 34 move towards the holding groove 25, so that the safety latch 34 rotate relative to the placement portion 20 to make the buckling portion 344 pass through the latching notch 259 and engage with the latching slot 96 to lock the electronic device 90 on the charging apparatus 100. Therefore, the electronic device 90 is in charging or in data transmitting.

Figure 9:
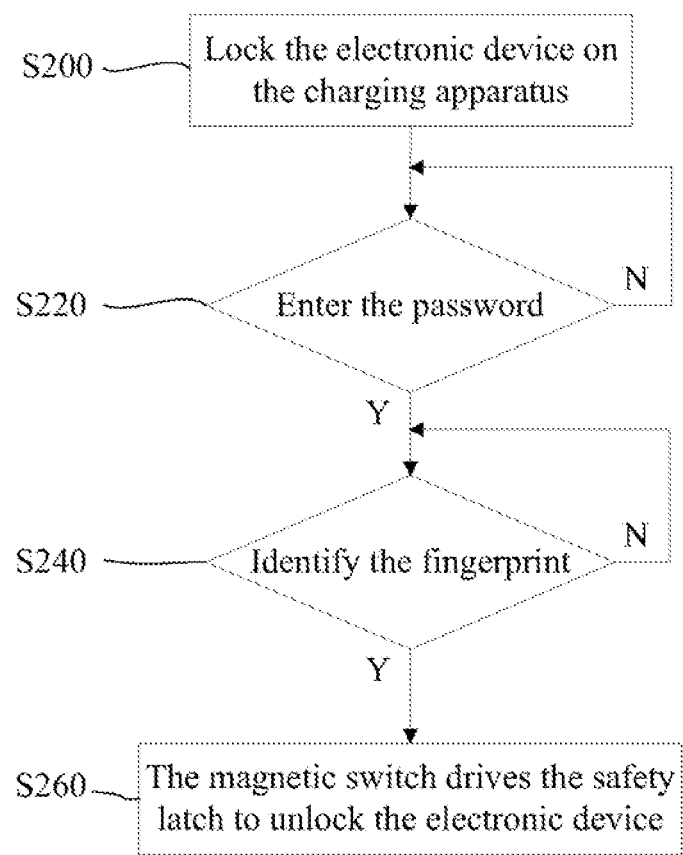
FIG. 9 is a flowchart of the exemplary embodiment of the charging apparatus unlocking the electronic device in accordance with the present disclosure.

Referring to FIG. 9, if the electronic device 90 has been finished charging or data transmitting, the next steps are needed to take the electronic device 90 out of the charging apparatus 100. In the step S200, the electronic device 90 is locked in the charging apparatus 100 by the safety latch 34 engaging with the latching slot 96 through the latching notch 259. In the step S220, the plurality of numeric buttons 13 is pressed to enter identification information, such as a password that is shown on display screen of the electronic device 90. If the password is collect, the process proceeds to the next step, and if the password is wrong, the process returns to the step S220. In the step S240, the fingerprint reader 15 is pressed by a finger to identify the fingerprint. If the fingerprint matches with the preset fingerprint stored in system, the process proceeds to the next step, and if the password is wrong, the process returns to the step S240. In the step S260, the magnetic switch 32 starts to drive the movable shaft 324 move away from the holding groove 25, so that the safety latch 34 rotate relative to the placement portion 20 to make the buckling portion 344 pass through the latching notch 259 and disengage with the latching slot 96 to unlock the electronic device 90 from the charging apparatus 100.

In one embodiment, the charging apparatus 100 is locked or unlocked with the electronic device 90 by entering a password and a fingerprint to identify users' ID and to switch on the magnetic switch 32 to drive the safety latch 34 lock the electronic device 90. Therefore, the electronic device 90 is safe in charging or data transmitting.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A charging apparatus used to support and charge an electronic device defining a latching slot, the charging apparatus comprising:
    a holding portion;
    a placement portion, engaging with the holding portion and defining a latching notch that matches with the latching slot when the electronic device is received in the placement portion; and
    a controlling portion, secured in the holding portion and comprising a magnetic switch and a safety latch, the magnetic switch comprising a movable shaft protruding outwardly from the magnetic switch towards the safety latch, the safety latch comprising a latching portion engaging with the movable shaft and pivoting to the placement portion, and a buckling portion engaging with the latching notch and the latching slot;
    wherein, the magnetic switch switches on upon input of a correct identification information to drive the movable shaft move, to urge the latching portion rotating relative to the placement portion and to urge the buckling portion to pass through the latching notch and engage with the latching slot, so as to lock the electronic device in the holding portion.

2. The charging apparatus as claimed in claim 1, wherein the identification information is a fingerprint and a password.

3. The charging apparatus as claimed in claim 1, wherein the holding portion comprises a panel, a plurality of first side walls extending from the panel, and a bottom cover, the panel and the plurality of first side walls cooperatively define a receiving space to receive the adjusting portion, the bottom cover is fixed on the plurality of first side walls above the receiving space.

4. The charging apparatus as claimed in claim 3, wherein the holding portion comprises a pair of second side walls and a pair of third side walls perpendicularly connecting with the pair of second side walls, the pair of second side walls and the pair of third side walls perpendicularly extend from the panel towards the receiving space respectively in parallel with the plurality of first side walls, and collectively define a receiving groove extending from the panel to receive the placement portion.

5. The charging apparatus as claimed in claim 4, wherein each of the pair of second side walls defines a latching groove, the placement portion comprises a pair of first rotating shafts engaging with the corresponding latching groove to rotatably mount the placement portion on the holding portion.

6. The charging apparatus as claimed in claim 3, wherein the charging apparatus comprises a circuit board portion fixed in the receiving space, the holding portion comprises a plurality of numeric buttons, a power button and a fingerprint reader, the panel defines a plurality of first receiving holes, a second receiving hole and a third receiving hole, each of the plurality of numeric buttons is inserted into the corresponding first receiving hole and electrically connects to the circuit board portion, the power button is inserted into the second receiving hole and electrically connects to the circuit board portion, and the fingerprint reader is inserted into the third receiving hole and electrically connects with the circuit board portion.

7. The charging apparatus as claimed in claim 1, wherein the placement portion comprises a pair of strengthening boards on two sides of the latching notch, each of the pair of strengthening boards defines a rotating hole, the safety latch comprises a pair of protruding shafts configured on two sides of the buckling portion, each of the pair of protruding shafts is rotatably received in the rotating hole to movably mount the safety latch on the placement portion.

8. The charging apparatus as claimed in claim 1, wherein the movable shaft comprises a first block and a second block spaced from the first block, the latching portion defines a gourd hole away from the buckling portion, the movable shaft passes through the gourd hole to restrict the latching portion between the first block and the second block so as to axially mount the latching portion on the movable shaft.

9. The charging apparatus as claimed in claim 1, wherein the placement portion defines a holding groove collectively formed by a bottom side and a plurality of side walls extending from the bottom side to receive the electronic device, and comprises an electrical connector configured on the bottom side to electrically connect with the electronic device.

10. The charging apparatus as claimed in claim 9, wherein the placement portion comprises a pair of positioning columns protruding from the bottom side towards the holding groove, the pair of positioning columns engages with the electronic device to mount the electronic device in the holding groove.

11. A charging apparatus, comprising a holding portion defining a receiving groove, a placement portion rotatably received in the receiving groove and defining a holding groove to receive and position an electronic device configured with a latching slot, and a controlling portion operable to pass through a latching notch in the placement portion and interfere with the latching slot to lock the electronic device in the placement portion; the controlling portion comprising a magnetic switch and a safety latch, the magnetic switch comprising a movable shaft protruding from the magnetic switch towards the safety latch, the safety latch comprising a latching portion engaging with the movable shaft and pivoting with respect to the placement portion, and a buckling portion passing through the latching notch and interfering with the latching slot.

12. The charging apparatus as claimed in claim 11, wherein the placement portion comprises a pair of strengthening boards on two sides of the latching notch, each of the pair of strengthening boards defines a rotating hole, the safety latch comprises a pair of protruding shafts configured on two sides of the buckling portion, each of the pair of protruding shafts is rotatably received in the rotating hole to movably mount the safety latch on the placement portion.

13. The charging apparatus as claimed in claim 12, wherein the movable shaft comprises a first block and a second block spaced from the first block, the latching portion defines a gourd hole away from the buckling portion, the movable shaft passes through the gourd hole to restrict the latching portion between the first block and the second block so as to axially mount the latching portion on the movable shaft.

14. The charging apparatus as claimed in claim 13, wherein the latching portion is integrally formed with the buckling portion.

15. The charging apparatus as claimed in claim 11, wherein the holding portion comprises a panel, a plurality of first side walls extending from the panel, and a bottom cover, the panel and the plurality of first side walls cooperatively define a receiving space to receive the adjusting portion, the bottom cover is fixed on the plurality of first side walls above the receiving space.

16. The charging apparatus as claimed in claim 15, wherein the holding portion comprises a pair of second side walls and a pair of third side walls perpendicularly connecting with the pair of second side walls, the pair of second side walls and the pair of third side walls perpendicularly extend from the panel towards the receiving space respectively in parallel with the plurality of first side walls, and collectively define the receiving groove extending from the panel to receive the placement portion.

17. The charging apparatus as claimed in claim 16, wherein each of the pair of second side walls defines a latching groove, the placement portion comprises a pair of first rotating shafts engaging with the corresponding latching groove to rotatably mount the placement portion on the holding portion.

18. The charging apparatus as claimed in claim 11, wherein the placement portion comprises a bottom side, a plurality of side walls extending from the bottom side, and an electrical connector configured on the bottom side to electrically connect with the electronic device, the bottom side and the plurality of side walls collectively form the holding groove.

19. The charging apparatus as claimed in claim 18, wherein the placement portion comprises a pair of positioning columns protruding from the bottom side towards the holding groove, the pair of positioning columns engages with the electronic device to mount the electronic device in the holding groove.

20. A charging apparatus used to support and charge an electronic device, the charging apparatus comprising: a holding portion; a placement portion pivoting with respect to the holding portion to receive and support the electronic device; a magnetic switch secured in the holding portion, the magnetic switch comprising a movable shaft protruding outwardly from the magnetic switch; a safety latch secured in the holding portion and engaging with the magnetic switch, the safety latch comprising a latching portion engaging with the movable shaft and pivoting with respect to the placement portion; and a buckling portion engaging a latching notch in the placement portion and a latching slot in the electronic device, wherein when the magnetic switch drives the movable shaft towards a first direction, the safety latch rotates relative to the placement portion to lock the electronic device on the charging apparatus to allow the charging apparatus to charge and transmit data, wherein when the magnetic switch drives the movable shaft away from the first direction, the safety latch rotates relative to the placement portion to unlock the electronic device from the charging apparatus in order to finish charging and transmitting data.

* * * * *